United States Patent [19]
Jones

[11] 3,793,858
[45] Feb. 26, 1974

[54] CONNECTOR

[76] Inventor: Ralph W. Jones, c/o West Coast Chain Mfg. Co., 2242 E. Foothill Blvd., Pasadena, Calif. 91107

[22] Filed: Apr. 30, 1971

[21] Appl. No.: 139,015

[52] U.S. Cl. .............. 70/457, 24/230 LP, 24/201 A, 24/211 L
[51] Int. Cl. ...................... A44b 17/00, A44b 15/00
[58] Field of Search 24/201 BN, 201 S, 217, 230 B, 24/230 P, 108, 211 L, 218, 110, 216; 287/DIG. 7, 53, 53 H; 339/74; 292/353, 19; 70/457; 285/DIG. 22, 317

[56] References Cited
UNITED STATES PATENTS

| | | | |
|---|---|---|---|
| 1,585,478 | 5/1926 | Fife | 24/211 |
| 230,402 | 7/1880 | Sadler | 24/110 |
| 2,829,416 | 4/1958 | Sam | 24/217 |
| 217,269 | 7/1879 | Cooke | 24/110 |
| 524,523 | 8/1894 | Champenois | 24/110 |
| 586,118 | 7/1897 | Dowse | 24/217 |
| 1,911,935 | 5/1933 | Vidal | 24/110 |
| 2,364,266 | 12/1944 | Bryce | 24/217 |
| 2,518,385 | 8/1950 | Shann | 292/19 |
| 3,600,917 | 8/1971 | Krock | 24/230 F |

FOREIGN PATENTS OR APPLICATIONS

| | | | |
|---|---|---|---|
| 3,679 | 10/1874 | Great Britain | 24/110 |
| 9,991 | 10/1956 | Germany | 70/457 |

*Primary Examiner*—Bernard A. Gelak
*Attorney, Agent, or Firm*—Harris, Kiech, Russell & Kern

[57] ABSTRACT

A connector wherein a shaft member has projection means such as lip for engaging a forwardly facing edge of a strip to prevent rearward movement of the shaft member relative to the strip. Actuating means are provided for moving the strip from a normally closed position of engagement with the projection means to an open position of disengagement.

6 Claims, 7 Drawing Figures

PATENTED FEB 26 1974　　　3,793,858

INVENTOR
RALPH W. JONES
BY HIS ATTORNEYS
HARRIS, KIECH, RUSSELL & KERN

CONNECTOR

This invention relates generally to connectors and more particularly to connecting devices requiring frequent and easily accomplished engagement and disengagement between two members while at the same time providing a secure, reliable, and high-strength connection during engagement.

Prior art connectors are usually designed primarily for strength or primarily for ease of operation. Thus, a high-strength connector is often cumbersome to operate, while an easily operated connector may be unreliable under conditions of stress. However, there are instances where it is very desirable to combine both strength and ease of operation into a single inexpensive connector. This combination of features is particularly important in high strength connectors which during the course of their use and operation are frequently closed and opened. Such frequent operation may be difficult and time consuming, and often serves to decrease and ultimately wear out the holding capability of the connector. This combination of features is also particularly important in easily-operated connectors which during the course of their use and operation are jerked, dropped, moistened, dried, heated, cooled or otherwise subjected to extreme environmental conditions. Such sporadic changes in condition often break the connector, disable the operating parts, unduly diminish the strength of the connector, hamper the ease of operation of the connector, or make the connector subject to accidental or inadvertent release.

Accordingly, it is a general object of the invention to eliminate the foregoing deficiencies of the prior art and to provide a connector which during the course of repeated and continual use under diverse environmental conditions combines both ease and facility of operation on the one hand with high reliability and strength on the other.

A primary object of the invention is to provide a connector which is not subject to accidental or unintentional disconnection, and which can be opened only by a force exerted in a predetermined direction, while at the same time resisting disconnective forces exerted in other directions.

Another primary object is to provide a connector which is easily engaged or disengaged by finger flexing of minimal skill and dexterity against a small responsive actuating area in a manner readily discernible by either touch or sight, thereby eliminating the need for any familiarization period or operational instructions.

Another primary object is to provide a connector having a latching strip which by lengthwise compression deflects easily in a direction normal to the strip while strongly resisting deflection or movement in directions coincident with the strip.

A specific object is to provide a connector having a pair of opposing strips with forwardly facing edges, and having a shaft which is easily insertable in a forward direction to a connection position between such strips, but which strongly resists withdrawal in a backward direction to a disconnection position. A related object is to provide a tapered forward end on the shaft for spreading the strips during the initial connection.

Another specific object is to provide a connector having the aforementioned characteristics wherein a lip on the shaft engages the forwardly facing edges of the opposing strips to securely and reliably prevent the shaft from moving in the axial direction while at the same time allowing the shaft to rotate around its axis.

A further specific object is to provide a connector having the aforementioned characteristics wherein a cylindrical wall receives the shaft, guides it in a predetermined direction to a locking position between the opposing strips, and prevents the shaft from moving in directions normal to its axis.

More particularly, it is an object of the invention to provide a connector for securing keys or other articles, such as by releasably securing a small diameter chain on which the keys or other articles are carried. In this regard, it is an object of the invention to provide a connector having a small flat casing surrounding a movable latching strip therein, with a chain permanently affixed to the casing and carrying a shaft removably engageable with the latching strip, with a button on the periphery of the casing for laterally deflecting the latching strip at any time by longitudinal compression.

Another object is to provide a connector which is small, lightweight, simple and inexpensive to manufacture, and which has a minimal number of parts which provide effective trouble-free operation over a long period of time with little or no care and maintenance.

Further objects, features, and advantages of the invention will be evident to those skilled in the art from the following description of the various embodiments and alternative forms of the invention.

Figure 1:
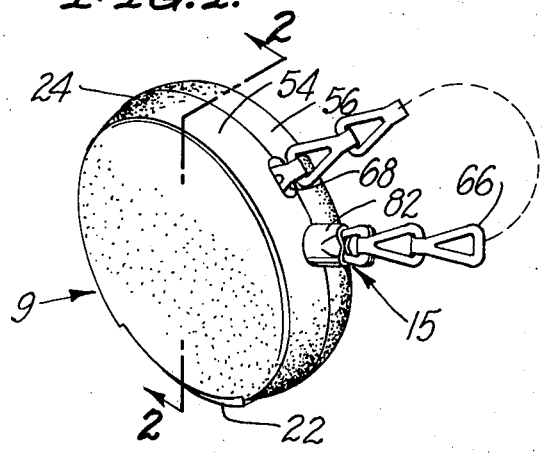
FIG. 1 is an isometric projection of a preferred embodiment of the invention.
Figure 2:
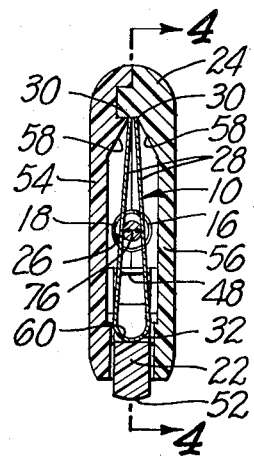
FIG. 2 is a sectional view taken along the line 2—2 in FIG. 1 showing a casing having a latching strip in closed position against a shaft member.
Figure 3:
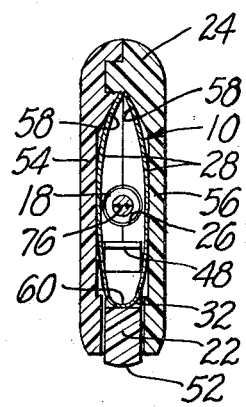
FIG. 3 is a sectional view similar to FIG. 2 showing the latching strip in open position.

Generally speaking, the invention provides a first member 9 having a latching strip 10 with an edge 12 facing a forward longitudinal direction 14 and movable laterally from a normally closed position (FIG. 2) to an open position (FIG. 3). A second member 15 provides a shaft 16 having projection means such as a lip 18 engageable with the edge 12 of the latching strip 10 in closed position preventing rearward longitudinal movement of the second member relative to the first member. The latching strip 10 is normally biased toward a closed position and is movable to open position by a tapered head 20 on the forward end of the shaft 16 or by a button 22 coupled to the latching strip. Displacement or flexing of the latching strip 10 from closed position to open position by either the tapered head 20 or button 22 requires only a small easily applied force, in contrast to the high holding strength of the closed latching strip against rearward longitudinal movement of the shaft 16, all as discussed hereinafter.

More particularly, the first member 9 in its illustrated form has latching strip 10, button 22, a casing 24, and a cylindrical wall 26. The latching strip 10, while not limited to specific dimensions or shape, is preferably a single piece of flexible metal which is bent back on itself in a hairpin fashion, forming two matching legs 28 having their loose ends 30 almost touching. The distance between the legs 28 when the latching strip 10 is in the normally closed position (FIG. 2) increases in the direction away from the ends 30 up to a maximum separation at a junction 32 of the legs. A latching strip 10 particularly adaptable for use with a connector for a key chain is made from beryllium copper about 0.005 inch thick, and has legs 28 each about one-half inch long and about one-eighth inch wide, and spaced about one-eighth inch apart adjacent their junction 32.

Figure 6:
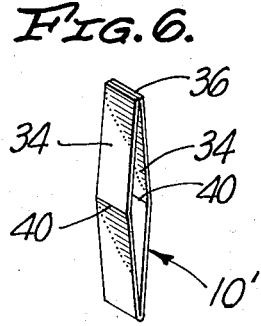
FIG. 6 shows one alternative form of latching strip.

An alternative latching strip 10' shown in FIG. 6 has a pair of legs 34 immediately adjacent each other both at their loose ends 36 and at their junction. The space separating the legs 34 in their closed position resembles an elongated diamond shape having its widest separation at about the midpoint 40 of the legs.

Figure 7:
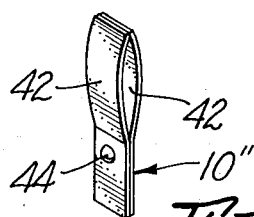
FIG. 7 shows another alternative form of latching strip.

Another alternative latching strip 10'' shown in FIG. 7 has a pair of legs 42 made from separate pieces of metal which are suitably attached as by a rivet 44. The legs 42 in the closed position are shaped and positioned to form a pointed oval space therebetween. Of course, other variously shaped and sized latching strips, both singly and in pluralities, are contemplated by the invention in addition to the illustrated forms.

Button 22 has a pair of inner flanges 46 carrying inwardly directed spring supports 48 and a pair of outer flanges 50 joined by a convex actuating surface 52. The casing 24 shown is generally coin-shaped, having upper and lower portions 54, 56. The cylindrical wall 26 lies within the casing 24 and defines a straight tunnel in the plane of the casing 24 connecting the peripheral edge of the casing with space outside.

The first member 9 is preferably designed as a single integral unit. Accordingly, the inside of the casing 24 defines a hollow interior that intercepts the tunnel defined by the cylindrical wall 26. The latching strip 10 is mounted and aligned in the hollow interior so that the plane of the casing substantially coincides with the plane of the latching strip 10, and so that the tunnel passes between the legs 28 and is substantially perpendicular to the legs. The ends 30 of the legs 28 are confined by an inclined notch 58 inside the casing 24 and the rest of the legs are allowed room for lateral outward expansion in a direction normal to the plane of the casing 24. Forward or rearward movement of the latching strip is prevented by the adjacent interior contact surfaces of the casing 24. The junction 32 of the legs 28 is confined by a matching recess 60 on the inside of the button 22, which is mounted in a suitable hole cut out from the peripheral edge of the casing 24.

Figure 4:
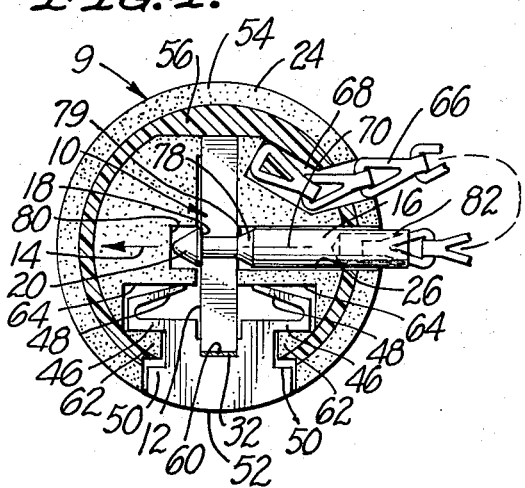
FIG. 4 is a sectional view taken along the line 4—4 in FIG. 2.

The button 22 is held in position by and is movable in and out between a pair of stop members 62 extending from the casing 24 into the space on the button 22 between the inner and outer flanges 46, 50. The button 22 is normally impelled outwardly by the flexing action of the spring supports 48 against the interior casing contact surface 64, allowing the latching strip to rest in its normally closed position. The latching strip 10 is not attached to the button 22 but rather just loosely confined in a normally relaxed state. The spring supports 48 on the button 22 are designed to hold it out off the spring strip, "rattle free." This in turn allows for sufficient manufacturing tolerances for the length of latching strip 10 and the length of cavity in which it is confined. (FIGS. 2 and 4).

When the button 22 is in its normal outward position, the actuating surface 52 serves as a small continuation of the periphery of the casing 24. Thus, normal handling and use of the connector and a chain, key, or other article attached thereto will not depress the button. However, the discontinuity of the casing can easily be felt and the actuating surface 52 identified when one wants to consciously and intentionally depress the button 22 to cause lengthwise compression of the latching strip 10.

Furthermore, the hairpin shape construction of the latching strip 10 serves to create a rather high resistance to initial longitudinal compression, thus further assuring against accidental disconnection. In addition, the hairpin shape construction has the functional advantage of providing an immediate and continual decrease of resistance once the higher threshold resistance is overcome and the legs 28 begin to bow outwardly. This over center or snap action is due to the outward collapse of the substantially straight sections under compression, much like the buckling of a slender column under a load. The farther that the legs 28 are allowed to buckle outward, the more pronounced the snap action feeling of the button 22. This feeling is important because the displacement of the button 22 is so small that a user might not otherwise be able to tell when the button had been depressed far enough to deflect the legs 28 outwardly from the shaft 16 to disengage the lip 18, thereby unlatching the connector.

The second member 15 in its illustrated form has shaft 16, lip 18, tapered head 20, and a chain 66. The shaft 16 is permanently mounted by conventional attachment directly to a key or other article, or indirectly attached as on one end of the chain 66. A stamp-link woven chain of stainless steel of about one-eighth inch width is particularly suitable when a small diameter chain 66 is needed because of this woven chain's flexibility, low weight, high strength, and resistance to corrosion and wear. The other end of the chain 66 is permanently embedded by conventional means in an elbow recess 68 in the periphery of the casing 24. The shaft 16 carries the tapered head 20 at its forward end, typically a cone tapering constantly at about 30 degrees relative to the shaft axis 70 from a diameter approximating the shaft diameter to a forwardly facing crest. A circular notch having a width slightly greater than the width of the latching strip 10 divides the tapered head 20 from the rest of the shaft 16 and includes an inner rod 74 having a diameter 76 substantially the same as the space between the legs 28 at their midpoint. The forward boundary of the notch serves as the lip 18 in the form of a rearwardly facing disc extending substantially perpendicular to the axis 70 of the shaft 16. The rearward boundary of the notch is a forwardly facing tapered disc 78. Both the tapered head 20 and the tapered disc 78 facilitate insertion of the shaft 16 into the casing 24. The notch construction provides a lip 18 extending out from the adjacent portion of the shaft 16 for engagement with the forwardly facing edge 12 of the latching strip 10, without having to increase the diameter of the shaft.

The connector is used by inserting the shaft 16 into the tunnel defined by the cylindrical wall 26 until the tapered head 20 on the forward end of the shaft contacts a rearwardly facing edge 79 of the latching strip 10. The cylindrical wall 26 assures proper alignment of the axis 70 of the shaft 16 with the forward longitudinal direction 14 defined by the latching strip 10, and midway between each leg 28 and forwardly facing edge 12 thereof. Further insertion is accomplished by exerting against the shaft 16 additional forwardly directed force of sufficient magnitude to overcome the lateral spring force of the latching strip 10 directed toward and normal to the axis of the shaft 16. This lateral spring force is caused by the inherent resilience of the latching strip 10. Therefore, it will be understood by those skilled in the art that by changing the material, shape and dimensions of the legs 28 it is possible to achieve almost any desirable predetermined lateral spring force. As this lateral spring force is overcome, and as the resistive friction force between the tapered head 20 and the legs 28 is also overcome, the tapered head 20 passes forwardly beyond the latching strip allowing each leg to spring back into closed position against the inner rod 74 of the shaft 16 and between the lip 18 and the forwardly facing disc 78 (see FIGS. 2 and 4).

Further insertion in the forward direction 14 is prevented by contact of the forward end of the shaft 16 against an interior abutment 80 at the end of the cylindrical wall 26. Any rearward retraction of the shaft 16 is prevented by the contact of each forwardly facing edge 12 with the rearwardly facing disc of the lip 18. In fact, any rearward disconnective force exerted on the shaft 16 tends to clamp the latching strip 10 in closed position against the lip 18 so that it would resist moving to the open position even with intentional or accidental pressure on the actuating surface 52 of the button 22. Any non-axial disconnective forces exerted on the first or second member or portions thereof are either prevented or dissipated by the cylindrical wall 26 surrounding and contacting the outer surface of the shaft 16. Nevertheless, the shaft 16 can still rotate and swivel about its axis while being retained in locking engagement with the latching strip 10.

It is to be noted that the foregoing insertion step and the retraction step discussed below are greatly facilitated in the manual operation of the illustrated key chain embodiment by having an elongated shaft of about three-fourths inch having substantially the same diameter throughout its length as the diameter of the cylindrical wall 26, and which is appreciably longer than the tunnel defined by the cylindrical wall. In addition, such an elongated shaft 16, particularly when used with a chain of the same diameter, facilitates the threading of keys over the shaft and onto the chain.

Figure 5:
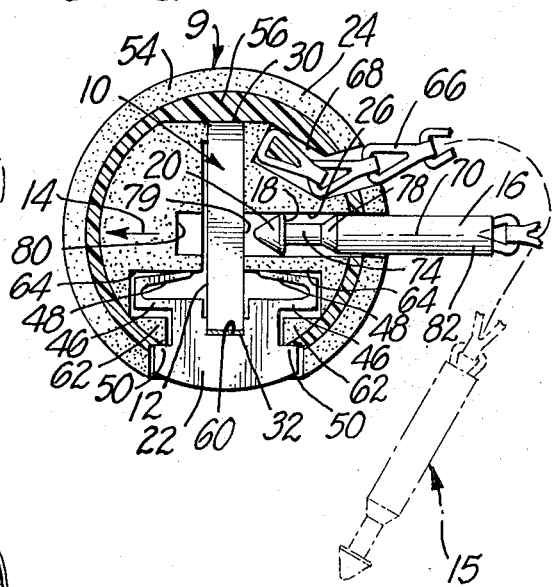
FIG. 5 is a sectional view similar to FIG. 4 showing the latching strip in open position and the shaft member partially withdrawn and completely withdrawn from the casing.

Disconnection is initiated by depressing the button 22 relative to the surrounding casing 24 (see FIGS. 3 and 5), thereby causing longitudinal compression of the latching strip 10 and outward flexing of each leg 28 to a separation distance greater than the diameter of the shaft 16. The second member 15 can then be removed from the first member 9 by grasping and retracting the rearward end 82 of the shaft extending out of the tunnel beyond the casing 24. Even if the button 22 is released prematurely, the shaft 16 can be withdrawn against the frictional force of the legs 28 against the tapered head 20, so long as the lip 18 has moved rearwardly past the forwardly facing edge 12 of the latching strip 10. It is to be emphasized that accidental partial depression of the button 22, as by inadvertence, is insufficient to accomplish disconnection since the resulting partial spreading of the legs 28 in opposing directions and normal to the forward longitudinal direction 14 only transfers the contact edge 12 radially outward on the lip 18. No disengagement occurs until full depression of the button 22 is effected.

Of course, the amount of force necessary to exert on the button 22 to cause disengagement between the lip 18 and the edge 12 is determined by the radial spring force holding the latching strip 10 in a closed position, all as previously described. Also, it should be remembered that in the exemplary form, such disengagement occurs as a result of the previously described unique snap action of the latching strip 10 rather than merely by its lateral translational displacement. Nevertheless, it is within the spirit of the invention to provide various means for moving the latching strip 10 substantially normal to said forward direction 14 from a closed position to an open position.

The preferred embodiment described above has been used in combination with the best small diameter prior art key chain—a stamp-link woven chain of stainless steel—and was found to be stronger, more reliable, and easier to use than any prior art connectors, in addition to having the numerous specific operational and structural advantages already described.

It will therefore be appreciated that the aforementioned structural features work together to form a unique connector which combines both ease and facility of operation with strength and reliability in a unique way applicable to many uses, and particularly adaptable and useful in a connector designed for securing keys and other articles.

Although an exemplary embodiment and some alternative forms of the invention have been disclosed and discussed, it will be understood that other applications of the invention are possible, and that the embodiments and forms disclosed may be subjected to various changes, modifications, and substitutions without necessarily departing from the spirit of the invention.

I claim as my invention:

1. In a connector, the combination of:
   a first member comprising two flat elongated spring plate legs attached together at a junction, and having an edge facing in a forward direction with the portion between said junction and the ends of said legs spaced apart and with said ends inclined toward each other;
   a single button contacting said junction of said two legs for longitudinally compressing said first member to bow said portion between said junction and the ends of said legs outwardly in opposite directions substantially normal to said forward direction from a normally closed position to an open position;
   a second member having a shaft which fits between said legs in a position transverse to the direction of said longitudinal compression with rearwardly facing lip means engageable with said forwardly facing edge when said legs are in said closed position for positively latching and preventing rearward movement of said second member relative to said first member; and
   a mounting member holding said first member, including an opening for receiving said shaft and wall means for abutting said ends of said legs when said legs are longitudinally compressed by said button.

2. The combination of claim 1 wherein said mounting member includes
a flat casing having top and bottom face members joined at an outer periphery with said first member mounted inside said casing to bow outwardly toward said face members in a direction substantially normal to the plane of the casing between a normally closed position and an open position; and including
longitudinal wall means in said casing defining a passage extending in the direction of the plane of said casing between the periphery of said casing and said legs for receiving said shaft.

3. The combination of claim 1 wherein said first member includes a unitary flat flexible strip bent back on itself to form two opposing legs unconnected at one end and capable of bowing outwardly in directions substantially opposite to each other from said normally closed position to said open position when said bent strip is subjected to longitudinal compression.

4. The combination of claim 1 wherein said shaft constitutes a solid member having a forwardly tapered front end for moving said legs from said normally closed position to said open position.

5. The combination of claim 2 wherein said button for moving said legs from said normally closed position to said open position comprises a depressible portion of the periphery of said casing displaced approximately 90° from the opening in the periphery defined by said longitudinal wall means for receiving said shaft.

6. The combination of claim 2 wherein said first member comprises:
a U-shaped unitary latching strip having substantially straight opposing legs joined together at a junction and spaced apart a maximum distance at said junction and a minimum distance at their ends to buckle outwardly when subjected to longitudinal compression by said button; and
including a chain connecting the rearward end of said shaft with said casing for removably securing keys and the like.

* * * * *